Patented Dec. 19, 1933

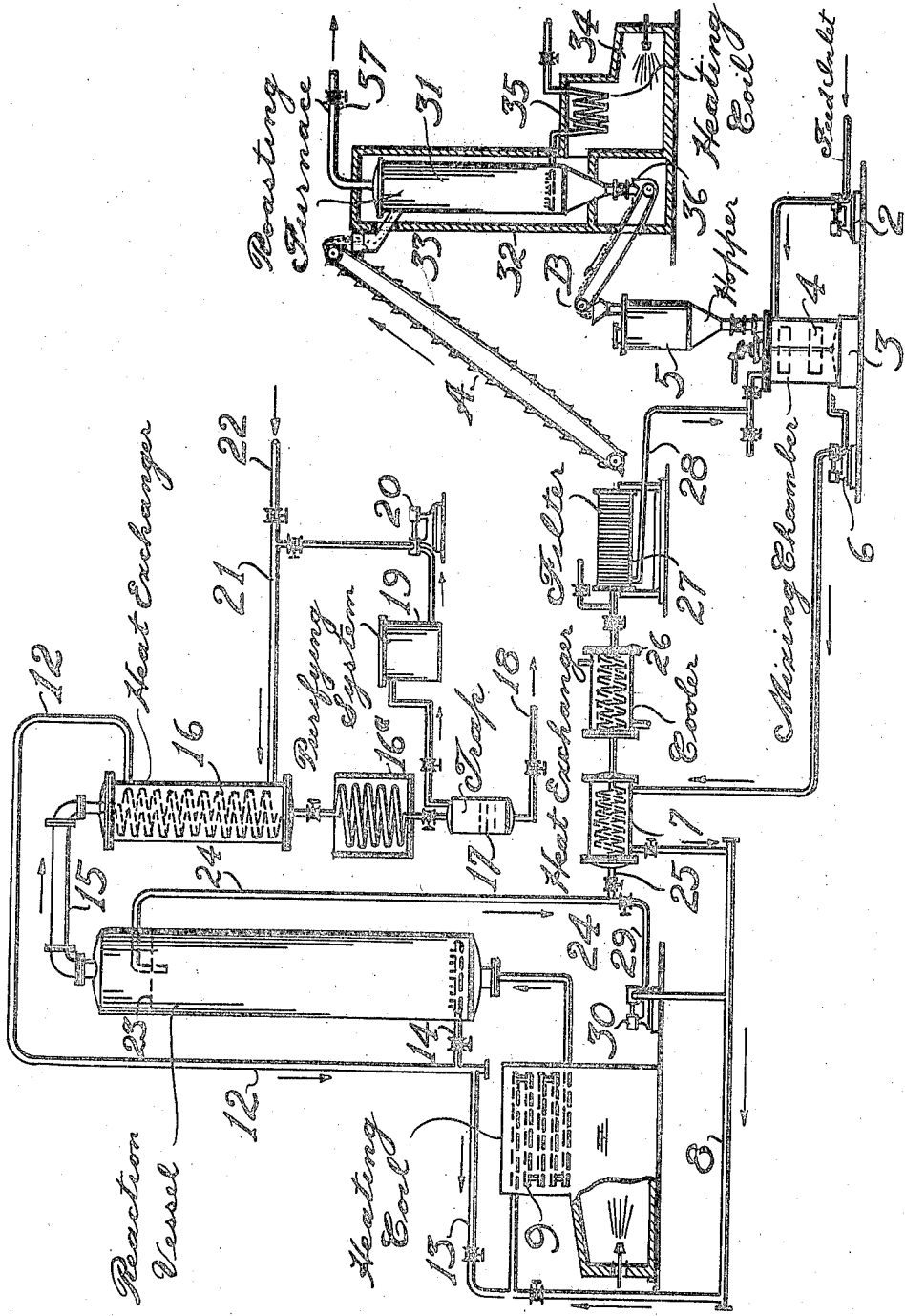

1,940,651

UNITED STATES PATENT OFFICE 1,940,651

PROCESS FOR PRODUCING REFINED HYDROCARBON OILS FROM UNREFINED HYDROCARBON MATERIAL

Harry H. Semmes, Washington, D. C., assignor to Standard-I. G. Company

Application January 30, 1930. Serial No. 424,613

4 Claims. (Cl. 196—53)

The present invention relates to an improved method for obtaining purified hydrocarbon oils from unrefined hydrocarbon materials and more specifically comprises an improved catalytic method for carrying out the refining process through the agency of purifying gas rich in hydrogen. My invention will be fully understood from the following description and the drawing which illustrates an apparatus suitable for carrying out the process.

The drawing is a semi-diagrammatic view in elevation of an apparatus constructed to carry out the invention and indicates the flow of the various materials through the process. Referring to the drawing reference numeral 1 indicates a feed line through which a pump 2 forces heavy hydrocarbon oil from any convenient source, not shown, to a mixing chamber 3. The mixing chamber 3 is fitted with a stirring device 4 and a hopper 5 or other suitable means for adding a suitable catalytic material, the nature of which will be disclosed below. The stirring means 4 is adapted to keep the finely ground catalytic material in a thorough state of distribution in the oil so that it may be removed in a state of substantially homogeneous distribution by pump 6 which forces the mixture through a heat exchanger 7 and into a feed line 8. The oily suspension is then passed through a heating coil 9 arranged in a fired setting 10 and is discharged into a reaction vessel 11 which is adapted to withstand pressures in excess of 200 atmospheres or more, as well as the corrosive effects of sulphur and hydrogen under such high pressures and at temperature in excess of about 700° F. Hydrogen, or a gas rich in free hydrogen is supplied by a high pressure manifold 12 and introduced into the inlet of coil 9 by a branch pipe 13 and may also be introduced directly into the reaction chamber by a second branch line 14. Gas and vapor produced in the oven are continuously removed by a vapor line 15 which is in communication with heat exchanger 16 and condenser 16a. The cooled mixture of condensed oil and gas is separated in a trap 17 from which gas is removed to a purifying system 19. The system may comprise any convenient means for removing hydrogen sulfide and hydrocarbons from the gas which is substantially free hydrogen and for this purpose a scrubbing system using oil and operating at high pressures is entirely suitable. Purified gas is then recompressed by a booster pump 20 and forced through line 21, heat exchanger 16 and back again into high pressure line 12. Makeup hydrogen may be added under high pressure through line 22. The condensate is withdrawn from trap 17 by means of a line 18 to a storage tank, not shown.

The suspension of heavy oil and catalytic material is maintained at a convenient level indicated at 23 in the drum 11 and it is kept in agitation either by the hydrogen introduced by pipe 14 alone, or by additional mechanical means, not shown. A portion of the heavy oil is withdrawn by a pipe 24 and is passed through a valved branch pipe 25 to heat exchanger 7, cooler 26 and suitable device 27 for removing the suspended catalytic material from the oil. A filter or any other equivalent means, such as a series of settling drums or the like is satisfactory. The filtrate may be returned to the mixing chamber 3 by means of a line 28 and returned therefrom to the system, as indicated before. If desired, only a part of the oil may be withdrawn through valved pipe 25 and the remainder may be directly returned to feed pipe 8 by means of a by-pass pipe 29 in which a suitable surge pump 20 is provided.

It will be understood that several filters 27 may be used in rotation, the one being in operation when the others are being discharged and the cake may be washed and revivified in any desirable manner.

It may be taken by a conveyor A and charged into the top of roasting furnace 31 which is arranged in a brick setting 32. The solid material is introduced by means of a hopper 33 and in passing downwardly through the shell 31 is brought into contact with a heated gas containing oxygen, which may be introduced through a heating coil 35. The coil 35 may be installed in a heating chamber 34 which may conveniently discharge its flue gases into the brick setting 32. The purified or recovered catalytic material may be collected through a trap 36 at the base of shell 32 and may be conveyed by a suitable conveyor B to the hopper 5 for reuse. Gases are discharged from the upper part of shell 32.

It is well known in the art that the ordinary hydrogenating catalysts are very sensitive to sulphur and other catalyst poisons which occur to a large extent in almost all petroleum products. For this reason it has been very difficult to hydrogenate crude oil or any cuts therefrom since the catalytic material rapidly loses its activity. Sulphur immune catalysts have been disclosed for this purpose, but such catalysts are generally very costly and to my knowledge are not so active as other catalysts which are poisoned by sulphur or other materials. I have discovered methods by which it is feasible to secure the high activity of catalysts such as nickel, cobalt, and iron or their oxides and the like, for the hydrogenation or destructive hydrogenation in spite of the fact that they are readily poisoned by sulphur, due to formation of inactive metal sulfides.

In the operation of my process I maintain a suspension of the oil at an elevated temperature, for example; above about 700° F. or preferably between 750 and 870° F. A mixture of oil and fresh catalyst is continually forced through a heating zone into the reaction zone and a portion of the oil containing spent or sulphur poisoned catalyst is continuously removed therefrom. Hydrogen is preferably forced through the heating zone with the oil and catalyst and into the reaction zone where it is present in large excess over that actually required to react with the oil and it is preferably at a high pressure. For example; pressure should be in excess of about 20 atmospheres and preferably at considerably higher pressures, say in excess of 100 or 200 atmospheres, although the use of the more active or sulfur poisoned catalysts permits operation at lower temperatures and pressures than are preferred with the less active or sulfur immune catalysts. Vapor and gas are continuously removed from the hydrogenation zone and a light oil product similar to gasoline is condensed from the gas and separately collected.

The rapidity with which the catalytic agent is poisoned depends on the nature of the particular catalyst used and also on the amount of sulphur or other poisons which may be present in the oil. My process, of course, operates most successfully on oils in which there is a relatively small quantity of sulphur, but it may be used successfully on any type of crude oil, coal tar or other liquid or liquefied hydrocarbon. As catalytic agents I use heavy metals such as copper, zinc, nickel, cobalt and iron as metals or as oxides, but it will be understood that other suitable materials having the characteristics of promoting hydrogenation reactions and being subject to sulphur poisoning under the operating conditions may be used. It is desirable to remove the catalyst as soon as it has been reduced to an inactive form and this may be done by removing the oil continuously from the reaction zone, cooling it and separating the suspended solid material either by filtration or by other suitable means. The oil free of solid matter may be mixed with other fresh catalyst and returned to the reaction zone as described above. The catalytic material may then be washed and dried in any suitable manner and may be reactivated, the particular method preferred depending on the nature of the particular material. For example; catalysts such as nickel and cobalt or other metals or oxides, may be dissolved in acids and reprecipitated in a purified form for reuse. Such materials may also be obtained in purified form by the action of purifying gases, for example; the material may be subjected at a high temperature to air or oxygen underroasting conditions suitable for removing sulphur in the form of sulphur dioxide.

By the use of my process I am able to obtain large yields of low boiling hydrocarbons similar to gasoline by the action of high pressure hydrogen and relatively cheap catalytic materials. The yield of gasoline is considerably larger than may be obtained by any cracking method and little or no solid carbonaceous matter is precipitated in the reaction chamber or the heating coil.

This invention is a modification of the invention disclosed broadly in my co-pending application, Serial No. 424,614, filed January 30, 1930, and is specific to the continuous withdrawal and recirculation to the hydrogenation zone of liquid oil with removal therefrom of used catalyst and addition of active catalyst to the oil.

My invention is not to be limited by any theory of the mechanism of the reactions nor to any specific example which may have been given for purpose of illustration, but only by the following claims in which I wish to claim all novelty inherent in my invention.

I claim:

1. A continuous process for the destructive hydrogenation of sulfur-containing hydrocarbon oils, comprising continuously passing said oil, substantially in liquid phase, and containing in suspension a finely divided hydrogenation catalyst subject to sulfur poisoning comprising a substance selected from the group of iron, cobalt, nickel, and their oxides, with hydrogen into a reaction zone maintained at a pressure above about 20 atmospheres and at a destructive hydrogenation temperature, continuously withdrawing vapor and gas and a liquid suspension of said catalyst from said reaction zone, separating a portion of said catalyst from said suspension, reactivating the separated catalyst by roasting, then reintroducing said reactivated catalyst into said suspension and continuously returning said resulting suspension to said reaction zone.

2. Process according to claim 1 in which catalyst is separated from only a part of the oil withdrawn from the reaction zone, fresh catalyst is added to the other part and this latter part is then recycled to the reaction zone.

3. Process according to claim 1 in which the catalyst comprises a metallic substance readily convertable to an inactive sulfide.

4. Process according to claim 1 in which a metal oxide, capable of forming an inactive sulfide is used as a catalyst and such catalyst as soon as converted to an inactive form is withdrawn and revivified by heating to a high temperature in the presence of free oxygen and returned for reuse.

HARRY H. SEMMES.